United States Patent [19]
Ohlinger et al.

[11] Patent Number: 5,209,970
[45] Date of Patent: May 11, 1993

[54] MAGNETIC RECORDING MEDIA

[75] Inventors: Manfred Ohlinger, Frankenthal; Jenoe Kovacs, Hessheim, both of Fed. Rep. of Germany

[73] Assignee: BASF Aktiengesellschaft, Ludwigshafen, Fed. Rep. of Germany

[21] Appl. No.: 567,066

[22] Filed: Aug. 13, 1990

[30] Foreign Application Priority Data

Aug. 22, 1989 [DE] Fed. Rep. of Germany ....... 3927622

[51] Int. Cl.$^5$ .............................................. G11B 23/00
[52] U.S. Cl. .................................. 428/329; 428/900; 428/694 B
[58] Field of Search ...................... 428/329, 694, 900; 252/62.51 C

[56] References Cited

U.S. PATENT DOCUMENTS

| 3,824,128 | 7/1974 | Akashi et al. | 117/235 |
| 4,316,927 | 2/1982 | Kimura et al. | 428/694 |
| 4,340,494 | 7/1982 | Ohlinger et al. | 252/62.51 C |
| 4,500,599 | 2/1985 | Ogawa et al. | 428/694 |
| 4,551,386 | 11/1985 | Yamaguchi et al. | 428/694 |
| 4,716,076 | 12/1987 | Morioka et al. | 428/694 |

*Primary Examiner*—Paul J. Thibodeau
*Attorney, Agent, or Firm*—Keil & Weinkauf

[57] ABSTRACT

Abstract of the Disclosure: Magnetic recording media comprise a nonmagnetic substrate and a magnetizable layer arranged thereon and essentially consisting of a magnetic material from the group consisting of the cobalt-modified iron oxides and of the hexagonal ferrites and inorganic fillers finely dispersed in organic binders, the inorganic filler used being ferromagnetic chromium dioxide.

1 Claim, No Drawings

MAGNETIC RECORDING MEDIA

The present invention relates to magnetic recording media comprising a nonmagnetic substrate and a magnetizable layer arranged thereon and essentially consisting of a magnetic material from the group consisting of the cobalt-modified iron oxides and of the hexagonal ferrites and inorganic fillers finely dispersed in organic binders.

As part of the further development of magnetic recording technology, high requirements are set for the recording media especially in magnetic video recording, with regard to both their magnetic or electromagnetic properties and their mechanical stability. A link between these two parameters is encountered in the homogeneity and surface quality of the magnetic layer, which are important for the functioning of video tapes. While many physically drying or crosslinked polymers or polymer mixtures have proven useful for the layer-forming binder, ferromagnetic cobalt-modified iron oxide or barium ferrite or strontium ferrite is the suitable magnetic material for most applications. However, it has now proven necessary to mix cobalt-modified iron oxides or ferrites with hard, spherical and nonmagnetic materials. One of the important reasons for this relates to the mechanical properties of the magnetic layer. Without these fillers, the heads of the recorders would rapidly become smeared. However, such nonmagnetic materials substantially reduce the residual induction of the recording media, so that certain properties, in particular the audio properties, are adversely affected to a decisive extent. It is also difficult to adapt acicular, magnetic materials and nonmagnetic, spherical substances to one another for the dispersion so that there is no phase separation between acicular and spherical substances. The result would be inhomogeneous surfaces of the magnetic layer and accumulation of the fillers at the surface. This would have an adverse effect on the recording quality, in particular with regard to the high frequency video information.

DE-A 19 55 699 long ago disclosed magnetic recording media which contain, as magnetic material in the magnetic layer, mixtures of chromium dioxide and doped or undoped iron oxides in a ratio of from 1:4 to 4:1. However, magnetic recording media containing corresponding mixtures of magnetic materials have the disadvantage that the excellent magnetic properties of the chromium dioxide and the resulting recording sensitivity are adversely affected by the high content of iron oxides. On the other hand, admixing large amounts of chromium dioxide leads to marked wear of the video heads.

It is an object of the present invention to provide magnetic recording media which are suitable in particular for video recording, do not have the above-mentioned disadvantages and possess satisfactory surface quality of the magnetic layer both with regard to homogeneity and smoothness and during recording and playback, ie. during tape/head contact, and ensure high video and audio quality in respect of blocking and head abrasion.

We have found that this object is achieved by magnetic recording media comprising a nonmagnetic substrate and a magnetizable layer arranged thereon and essentially consisting of a magnetic material from the group consisting of the cobalt-modified iron oxides and of the hexagonal ferrites and inorganic fillers finely dispersed in organic binders, if acicular ferromagnetic chromium dioxide having a coercive force of greater than 24 kA/m and a specific surface area of from 20 to 60 m$^2$/g is present in an amount of from >10 to <20%, based on the total amount of magnetic material, as the inorganic filler in the magnetic layer.

The cobalt-modified iron oxides or ferrites which are suitable for the novel recording media, and the chromium dioxide, are known magnetic materials and their preparation is likewise known. The coercive forces of the cobalt-modified iron oxides are from 30 to 128 kA/m, those of the ferrites are not more than 400 kA/m and those of the chromium dioxide are more than 24, in particular 26 to 80 kA/m. The magnetic materials which are suitable for use in the novel recording media should have a particle length of from 0.1 to 1.0 $\mu$m, in particular from 0.2 to 0.8 $\mu$m, and a length/width ratio of from 10:1 to 20:1, their particle volume advantageously being from $0.2 \cdot 10^{-4}$ to $2.0 \cdot 10^{-4} \mu m^3$. In the case of the novel recording media, it is also important that the BET specific surface area of the chromium dioxide is >20, preferably >25 to 60, m$^2$/g. The specific surface areas of the other magnetic materials may be of the same order of magnitude.

For the production of the novel recording media, the finely divided magnetic materials, the cobalt-modified iron oxide, in particular gamma-iron(III) oxide, and the chromium dioxide, together with the conventional additives, such as dispersants, for example sodium oleate, zinc oleate, sodium laurate, palmitate or stearate, ethylene oxide-modified assistants, comb-like polyimines, polyamides, organic phosphoric esters and, if required, the nonmagnetic fillers, for example quartz powder, silicate-based powders, alumina, zirconium oxide, which do not substantially influence the mechanical properties of the magnetic layer, and the binders dissolved in organic solvents, examples of these binders being elastomeric polyurethanes, epoxy resins, vinyl chloride/vinyl acetate copolymers, OH-containing polyurethanes crosslinked with polyfunctional isocyanates, and mixtures thereof, are converted into a dispersion in a dispersing apparatus, for example a tubular or stirred ball mill. This dispersion is then applied with the aid of a conventional coating apparatus to the nonmagnetic substrate. Suitable nonmagnetic substrates are the conventional substrates, in particular films of linear polyesters, such as polyethylene terephthalate, generally having a thickness of from 4 to 20 $\mu$m. Before the still liquid coating mixture is dried on the substrate, which is advantageously carried out in the course of from 10 to 200 seconds at from 50° to 90° C., the anisotropic magnetic particles are oriented along the intended recording direction by the action of a magnetic field. Thereafter, the magnetic layers can be calendered and compacted by passage between heated and polished rollers, if necessary with the use of pressure and at from 50° to 100° C., preferably from 60° to 90° C. The thickness of the magnetic layer is in general from 2 to 6 $\mu$m.

The novel magnetic recording media have high homogeneity and smoothness of the magnetic layer without blocking occurring during operation of these recording media. Furthermore, this permitted the use of the extremely finely divided cobalt-modified iron oxides required for good video recording properties, without resulting in the layer inhomogeneities or drop in output level which are caused by the conventional inorganic fillers, for example carbon black or quartz powder. This made it possible substantially to improve the hi-fi quality of the video tapes since virtually no remanence losses occur. The filling property affects the tape surfaces due to the easy agglomeration of the $CrO_2$ particles, which prevents contact between the tape surface and the hard video head.

The Examples which follow illustrate the invention and compare it with prior art experiments. In the Examples and Comparative Experiments, parts and percentages are by weight, unless stated otherwise.

COMPARATIVE EXPERIMENT 1

640 parts of a 12.5% strength solution of a thermoplastic polyesterurethane obtained from adipic acid, 1,4-butanediol and 4,4,-diisocyanatodiphenylmethane in a mixture of equal amounts of tetrahydrofuran and dioxane, and 100 parts of a 20% strength solution of a phenoxy resin of bisphenol A and epichlorohydrin in the same solvent mixture, were dispersed for 68 hours with 900 parts of a chromium dioxide having a coercive force of 48.5 kA/m and a BET specific surface area of 28.0 m$^2$/g, 2.25 parts of zinc oleate and a further 660 parts of the stated solvent mixture in a ball mill having a capacity of 6,000 parts by volume and containing 8,000 parts of steel balls having a diameter of from 4 to 6 mm. Thereafter, a further 640 parts of the stated polyesterurethane solution and 100 parts of the phenoxy resin solution and 18 parts of butyl stearate, 4.5 parts of stearic acid and 400 parts of the stated solvent mixture were added and dispersing was carried out for a further 24 hours. The resulting dispersion was filtered under pressure through a filter having 5 μm pores and was applied to a 14.5 μm thick polyethylene terephthalate film by means of a conventional knife coater.

The coated film was passed through a magnetic field to orient the magnetic particles and then dried at from 60° to 80° C. After drying, the magnetic layer of the coated film was compacted and calendered by being passed twice between heated rollers (85° C. under a nip pressure of 35 kg/cm). The thickness of the magnetic layer was then 4 μm. After the coated film had been slit into ½" wide video tapes, the latter were tested on a commercial VHS recorder from Victor Company of Japan, against a reference tape (0 dB).

1 Still Picture:

The still life is the time (in minutes) for which a video recording can be played back on a commercial VHS recorder as a still picture, ie. with stationary magnetic tape and rotating head wheel, until the first drop in output level of 16 dB.

2. Video S/N:

Ratio of the luminance signal of a 100% white image to the noise level, measured using the noise voltage meter UPSF from Rohde and Schwarz (>100 kHz).

In addition, the surface roughness in the form of the average peak-to-valley height $R_z$ according to DIN 4768, Sheet 1, and the head wear were determined. The head wear is measured with the aid of a measuring microscope and stated in μm. For this purpose, the video tape was operated for 200 hours in the reversing mode (corresponding to 100 passes) on a commercial VHS recorder, and the head wear of the standard ferrite heads is measured.

The results of the measurements are shown in the Table.

COMPARATIVE EXPERIMENT 2

The procedure described in Comparative Experiment 1 was followed, except that, instead of the chromium dioxide, 900 parts of a cobalt-modified gamma-iron(III) oxide having a BET specific surface area of 27.2 m$^2$/g and a coercive force of 51.6 kA/m were used. The results of the measurements are shown in the Table.

EXAMPLE 1

The procedure described in Comparative Experiment 2 was followed, except that, instead of the 900 parts of the cobalt-modified gamma-iron(III) oxide, only 845 parts of this material and 55 parts of chromium dioxide having a BET specific surface area of 25 m$^2$/g were used as described in Comparative Experiment 1. The results of the measurements are shown in the Table.

EXAMPLE 2

The procedure described in Comparative Experiment 2 was followed, except that, instead of the 900 parts of the modified iron oxide, 750 parts of the same oxide and 150 parts of chromium dioxide having a BET specific surface area of 30 m$^2$/g were used. The results of the measurements are shown in the Table.

EXAMPLE 3

The procedure described in Example 2 was followed, except that a cobalt-doped iron oxide having an $H_c$ value of 68 kA/m and a specific surface area of 52 m$^2$/g was used, the amount of the solvent being increased by 10%. The results of the measurements are shown in the

EXAMPLE 4

The procedure described in Example 2 was followed, except that, instead of the cobalt-modified iron oxide having a BET specific surface area of 27.2 m$^2$/g, one having a specific surface area of 35.2 m$^2$/g was used. The results of the measurements are shown in the Table.

COMPARATIVE EXPERIMENT 3

The procedure described in Comparative Experiment 2was followed, except that, instead of the 900 parts of a cobalt-modified iron oxide, 450 parts of the same oxide and 450 parts of the chromium dioxide from Comparative Experiment 1 were used. The results of the measurements are shown in the Table.

TABLE

| Experiment No. | Average peak-to-valley height $R_z$ (μm) | Head wear (μm) | Still picture (min) | Durability 100 h | S/N (dB) |
|---|---|---|---|---|---|
| Comp. Expt. 1 | 0.15 | >5 | >60 | Satisfactory | +1.5 |
| Comp. Expt. 2 | 0.16 | 1.0 | <10 | Transparent areas | +0.8 |
| Example 1 | 0.15 | 1.0 | >60 | Satisfactory | +0.1 |
| Example 2 | 0.12 | 1.5 | >60 | Satisfactory | +1.4 |
| Example 3 | 0.10 | 0.8 | >60 | Satisfactory | −0.2 |
| Example 4 | 0.12 | 1.0 | >60 | Satisfactory | +1.3 |
| Comp. Expt. 3 | 0.12 | 4.0 | >60 | Unsatisfactory, head became clogged up | — |

We claim:

1. A magnetic recording medium consisting essentially of a non-magnetic substrate and a magnetizable layer arranged thereon said magnetizable layer consisting essentially of a magnetic material from the group consisting of the cobalt-modified iron oxides and of the hexagonal ferrites in combination with acircular ferromagnetic chromium dioxide particles dispersed in organic binders, wherein said acicular ferromagnetic chromium dioxide particles have a coercive force of greater than 24 kA/m and a specific surface area of from 20 to 60 $m^2/g$ and are present in an amount of from >10 to 20%, based on the total amount of magnetic material.

* * * * *

UNITED STATES PATENT AND TRADEMARK OFFICE
CERTIFICATE OF CORRECTION

PATENT NO. : 5,209,970

DATED : May 11, 1993

INVENTOR(S) : Ohlinger et al.

It is certified that error appears in the above-identified patent and that said Letters Patent is hereby corrected as shown below:

In the claims

Claim 1, column 4, Line 68

That part reading "acircular" should read -- acicular --

Claim 1, Column 6, Line 2

That part reading "to 20%" should read -- to <20% --

Signed and Sealed this

Twenty-eighth Day of December, 1993

Attest:

BRUCE LEHMAN

*Attesting Officer*  *Commissioner of Patents and Trademarks*